US012762997B2

(12) United States Patent
Hussell

(10) Patent No.: US 12,762,997 B2
(45) Date of Patent: Oct. 13, 2026

(54) LIGHT-EMITTING DIODE PACKAGES WITH REAL-TIME PROCESSING AND RELATED METHODS

(71) Applicant: CreeLED, Inc., Durham, NC (US)

(72) Inventor: Christopher P. Hussell, Raleigh, NC (US)

(73) Assignee: CreeLED, Inc., Durham, NC (US)

( * ) Notice: Subject to any disclaimer, the term of this patent is extended or adjusted under 35 U.S.C. 154(b) by 576 days.

(21) Appl. No.: 18/169,264

(22) Filed: Feb. 15, 2023

(65) Prior Publication Data

US 2024/0274063 A1 Aug. 15, 2024

(51) Int. Cl.
*H04B 10/00* (2013.01)
*G09G 3/20* (2006.01)
(Continued)

(52) U.S. Cl.
CPC ............ *G09G 3/32* (2013.01); *G09G 3/2096* (2013.01); *H04B 10/00* (2013.01); *H04B 10/502* (2013.01);
(Continued)

(58) Field of Classification Search
CPC ... H04B 10/11; H04L 2209/20; H04L 7/0033; H05B 45/00; H05B 45/10; H05B 45/14;
(Continued)

(56) References Cited

U.S. PATENT DOCUMENTS 5,058,048 A 10/1991 Gupta et al.
5,130,988 A 7/1992 Wilcox et al.
(Continued)

FOREIGN PATENT DOCUMENTS

CN 1965340 A 5/2007
CN 101573843 A 11/2009
(Continued)

OTHER PUBLICATIONS

Office Action for Taiwanese Patent Application No. 113103331, mailed Dec. 2, 2024, 18 pages.
(Continued)

*Primary Examiner* — Daniel G Dobson
(74) *Attorney, Agent, or Firm* — Withrow & Terranova, P.L.L.C.

(57) ABSTRACT

Light-emitting diode (LED) packages and, more particularly, real-time digital communication for LED packages and related methods are disclosed. Discrete LED packages are arranged for cascade communication. Each LED package is separately capable of receiving communication from a data stream, controlling operation of one or more LED chips, and performing real-time processing on at least one alterable data value of the data stream. LED packages may include real-time processors capable of processing data from a data value of the data stream and introducing the processed or altered data back into the data stream in the same data value. LED packages are disclosed that may be assembled together in arrays where each LED package may separately process data and send the processed data to the next downstream LED package. Such real-time processing may be performed while also providing various bit delays within each LED package.

12 Claims, 7 Drawing Sheets

(51) Int. Cl.
*G09G 3/32* (2016.01)
*H04B 10/50* (2013.01)
*H04J 14/00* (2006.01)

(52) U.S. Cl.
CPC .............. *G05B 2219/25141* (2013.01); *G09G 2320/0626* (2013.01); *G09G 2370/00* (2013.01)

(58) Field of Classification Search
CPC ........ H05B 45/20; H05B 45/24; H05B 45/30; H05B 45/40; H05B 45/44; H05B 45/50; H05B 45/54; G09G 2310/08
See application file for complete search history.

(56) References Cited

U.S. PATENT DOCUMENTS 5,317,526 A 5/1994 Urano et al.
5,359,345 A 10/1994 Hunter
5,684,721 A 11/1997 Swoboda et al.
5,748,793 A 5/1998 Sanpei
6,000,051 A 12/1999 Nadeau-Dostie et al.
6,016,038 A 1/2000 Mueller et al.
6,088,445 A 7/2000 Chadha et al.
6,150,774 A 11/2000 Mueller et al.
6,166,496 A 12/2000 Lys et al.
6,211,626 B1 4/2001 Lys et al.
6,292,901 B1 9/2001 Lys et al.
6,378,093 B1 4/2002 Whetsel
6,388,388 B1 5/2002 Weindorf et al.
6,538,626 B1 3/2003 Nieberger et al.
6,715,105 B1 3/2004 Rearick
7,206,001 B1 4/2007 Crandall et al.
7,579,629 B2 8/2009 Inoguchi
7,593,021 B1 9/2009 Tynefield, Jr. et al.
8,111,001 B2 2/2012 Underwood et al.
8,328,405 B2 12/2012 Negley
8,922,458 B2 12/2014 Sefton et al.
8,937,492 B1 1/2015 Gideon
8,970,131 B2 3/2015 Brandes et al.
9,414,454 B2 8/2016 Brandes et al.
9,717,123 B1 7/2017 Yao
9,730,302 B2 8/2017 Vollmer et al.
9,739,834 B1 8/2017 Azimi et al.
10,123,385 B1 11/2018 Chang
10,368,411 B2 7/2019 Zhang et al.
10,384,239 B2 8/2019 Fedigan et al.
10,453,827 B1 10/2019 Hussell et al.
10,598,332 B1 3/2020 Elwell et al.
10,663,418 B2 5/2020 Magee et al.
10,682,675 B2 6/2020 Magee et al.
10,695,805 B2 6/2020 Magee et al.
10,891,884 B1 1/2021 Yang et al.
10,908,414 B2 2/2021 Revier et al.
11,792,898 B2 10/2023 Hussell et al.
11,974,371 B2 4/2024 Wang et al.
2001/0028356 A1 10/2001 Balogh
2002/0130627 A1 9/2002 Morgan et al.
2003/0030607 A1 2/2003 Kitagawa et al.
2003/0058885 A1 3/2003 Sorenson et al.
2004/0100475 A1 5/2004 Leather
2004/0160199 A1 8/2004 Morgan et al.
2004/0246278 A1 12/2004 Elliott
2005/0193294 A1 9/2005 Hildebrant
2005/0253824 A1 11/2005 Lin
2005/0275711 A1 12/2005 Liu et al.
2006/0022214 A1 2/2006 Morgan et al.
2006/0108952 A1 5/2006 Adler et al.
2006/0114269 A1 6/2006 Chang-Ho et al.
2006/0125742 A1 6/2006 Sekiguchi et al.
2006/0125771 A1 6/2006 Inuzuka et al.
2006/0168496 A1 7/2006 Steele et al.
2006/0244681 A1 11/2006 Nakajima
2007/0097055 A1 5/2007 Takamura et al.
2007/0132692 A1 6/2007 Yang
2007/0195025 A1 8/2007 Korcharz et al.
2007/0231846 A1 10/2007 Cosentino et al.
2007/0237165 A1 10/2007 Chiang
2007/0296464 A1 12/2007 Lewko
2008/0018261 A1 1/2008 Kastner
2008/0062158 A1 3/2008 Willis
2008/0136844 A1 6/2008 Takada et al.
2008/0238950 A1 10/2008 Saglam
2008/0245949 A1 10/2008 Morimoto et al.
2009/0066526 A1 3/2009 Marshall et al.
2009/0079362 A1 3/2009 Shteynberg et al.
2009/0109168 A1 4/2009 Lee et al.
2009/0147028 A1 6/2009 Sefton et al.
2009/0164713 A1 6/2009 Tsai et al.
2009/0179843 A1 7/2009 Ackerman et al.
2009/0187925 A1 7/2009 Hu et al.
2009/0201274 A1 8/2009 Kuwabara et al.
2009/0230885 A1 9/2009 Tanaka
2009/0278034 A1 11/2009 Ackermann et al.
2009/0295819 A1 12/2009 Buchner et al.
2010/0026208 A1 2/2010 Shteynberg et al.
2010/0085295 A1 4/2010 Zhao et al.
2010/0102734 A1 4/2010 Quick et al.
2010/0134257 A1 6/2010 Puleston et al.
2010/0156952 A1 6/2010 Arai
2010/0214764 A1 8/2010 Chaves et al.
2010/0309185 A1 12/2010 Koester et al.
2011/0057302 A1 3/2011 Spehar et al.
2011/0141002 A1 6/2011 Kim
2012/0056864 A1 3/2012 Aioanei
2012/0126711 A1 5/2012 Suminoe et al.
2012/0147567 A1 6/2012 Lee et al.
2012/0218754 A1 8/2012 Maes
2012/0286674 A1 11/2012 Takanashi
2012/0299480 A1 11/2012 Peting et al.
2012/0306942 A1 12/2012 Fujiwara et al.
2013/0057763 A1 3/2013 Cha et al.
2013/0076250 A1 3/2013 Logiudice
2013/0082615 A1 4/2013 Williams et al.
2013/0099681 A1 4/2013 Williams et al.
2013/0114021 A1 5/2013 Illyama et al.
2013/0169172 A1 7/2013 Kesterson et al.
2013/0228672 A1 9/2013 Jung et al.
2014/0028776 A1 1/2014 Kawamura
2014/0128941 A1 5/2014 Williams
2014/0152535 A1 6/2014 Zhang et al.
2014/0152902 A1 6/2014 Morrisseau
2014/0265919 A1 9/2014 Pope et al.
2014/0300937 A1 10/2014 Choe
2014/0306966 A1 10/2014 Kuo et al.
2015/0276144 A1 10/2015 Tudhope et al.
2015/0319814 A1 11/2015 Grotsch et al.
2015/0348496 A1 12/2015 Santos, II et al.
2015/0377695 A1 12/2015 Chang et al.
2016/0071467 A1 3/2016 Elder et al.
2016/0161326 A1 6/2016 Chang et al.
2016/0189605 A1 6/2016 Ahn et al.
2016/0217762 A1 7/2016 Moon et al.
2016/0293811 A1 10/2016 Hussell et al.
2016/0314730 A1 10/2016 Sampsell
2016/0358528 A1 12/2016 Xie et al.
2017/0004770 A1 1/2017 Jin
2017/0092198 A1 3/2017 Ryu et al.
2017/0111969 A1 4/2017 Zhao
2017/0135169 A1 5/2017 Panek et al.
2017/0168212 A1 6/2017 Chen et al.
2017/0263828 A1 9/2017 Mao et al.
2017/0294495 A1 10/2017 Shyu et al.
2017/0330509 A1 11/2017 Cok et al.
2017/0330856 A1 11/2017 Zou et al.
2018/0033768 A1 2/2018 Kumar et al.
2018/0035018 A1 2/2018 Yamada et al.
2018/0076368 A1 3/2018 Hussell
2018/0090059 A1 3/2018 Baroughi et al.
2018/0114800 A1 4/2018 Pan
2018/0130441 A1 5/2018 Jeon
2018/0138161 A1 5/2018 Spiegler et al.
2018/0182927 A1 6/2018 Vampola et al.
2018/0218670 A1 8/2018 Huska et al.

(56) References Cited

U.S. PATENT DOCUMENTS

| | | | |
|---|---|---|---|
| 2018/0247586 A1 | 8/2018 | Vahid Far et al. | |
| 2018/0247608 A1 | 8/2018 | Chen | |
| 2018/0261149 A1 | 9/2018 | Lin | |
| 2018/0348959 A1 | 12/2018 | Lin et al. | |
| 2019/0027082 A1 | 1/2019 | Van Belle | |
| 2019/0096503 A1 | 3/2019 | Chakravarty et al. | |
| 2019/0132921 A1 | 5/2019 | Rumer | |
| 2019/0132923 A1 | 5/2019 | Rumer | |
| 2019/0132929 A1 | 5/2019 | Sturm et al. | |
| 2019/0149792 A1 | 5/2019 | Luo et al. | |
| 2019/0302917 A1 | 10/2019 | Pan | |
| 2019/0335081 A1 | 10/2019 | Baar et al. | |
| 2019/0339573 A1 | 11/2019 | Wu et al. | |
| 2019/0371974 A1 | 12/2019 | Hussell | |
| 2020/0041111 A1 | 2/2020 | Lin et al. | |
| 2020/0105179 A1 | 4/2020 | Greenebaum et al. | |
| 2020/0105221 A1 | 4/2020 | Marcu et al. | |
| 2020/0135093 A1 | 4/2020 | Prathaban et al. | |
| 2020/0184900 A1 | 6/2020 | Shin et al. | |
| 2020/0203319 A1 | 6/2020 | Lee et al. | |
| 2020/0219436 A1 | 7/2020 | Singer et al. | |
| 2020/0229290 A1 | 7/2020 | Neumann | |
| 2020/0251050 A1 | 8/2020 | Yee | |
| 2020/0264476 A1 | 8/2020 | Yashiki | |
| 2020/0309357 A1 | 10/2020 | Hussell et al. | |
| 2020/0312220 A1 | 10/2020 | Hussell et al. | |
| 2020/0312222 A1 | 10/2020 | Hussell | |
| 2020/0312225 A1 | 10/2020 | Hussell | |
| 2020/0312226 A1 | 10/2020 | Hussell | |
| 2020/0312231 A1 | 10/2020 | Hussell | |
| 2020/0335042 A1 | 10/2020 | Son et al. | |
| 2021/0005761 A1 | 1/2021 | Tsai et al. | |
| 2021/0043821 A1* | 2/2021 | Hussell ................ | H10H 20/857 |
| 2021/0201769 A1 | 7/2021 | Morris et al. | |
| 2021/0399183 A1 | 12/2021 | Hussell et al. | |
| 2022/0028328 A1 | 1/2022 | Kim et al. | |
| 2022/0044643 A1 | 2/2022 | Gu et al. | |
| 2022/0086986 A1 | 3/2022 | Peng | |
| 2022/0198989 A1 | 6/2022 | Park et al. | |
| 2023/0252934 A1 | 8/2023 | Hussell | |
| 2023/0282786 A1 | 9/2023 | Favale, Jr. et al. | |
| 2023/0410742 A1 | 12/2023 | Lee et al. | |
| 2024/0159840 A1 | 5/2024 | Hussell | |

FOREIGN PATENT DOCUMENTS

| | | | |
|---|---|---|---|
| CN | 101926222 | A | 12/2010 |
| CN | 102224606 | A | 10/2011 |
| CN | 102483897 | A | 5/2012 |
| CN | 103198797 | A | 7/2013 |
| CN | 105911915 | A | 8/2016 |
| CN | 205546092 | U | 8/2016 |
| CN | 107316604 | A | 11/2017 |
| CN | 207852672 | U | 9/2018 |
| CN | 108986735 | A | 12/2018 |
| CN | 109712566 | A | 5/2019 |
| CN | 110782828 | A | 2/2020 |
| CN | 116347700 | A | 6/2023 |
| EP | 1306827 | B1 | 5/2003 |
| EP | 2400682 | A1 | 12/2011 |
| EP | 2437247 | A1 | 4/2012 |
| EP | 2515291 | B1 | 11/2016 |
| JP | 2001077832 | A | 3/2001 |
| JP | 2001134243 | A | 5/2001 |
| JP | 2002229502 | A | 8/2002 |
| JP | 2003044008 | A | 2/2003 |
| JP | 2009060192 | A | 3/2009 |
| JP | 2010091825 | A | 4/2010 |
| JP | 2010193217 | A | 9/2010 |
| JP | 201773411 | A | 4/2017 |
| KR | 20030081220 | A | 10/2003 |
| KR | 1020050111433 | A | 11/2005 |
| KR | 20060050356 | A | 5/2006 |
| KR | 20090116612 | A | 11/2009 |
| KR | 20110082137 | A | 7/2011 |
| TW | 201130379 | A | 9/2011 |
| TW | 201313056 | A | 3/2013 |
| TW | 201526700 | A | 7/2015 |
| TW | 202131297 | A | 8/2021 |
| WO | 2005048231 | A1 | 5/2005 |
| WO | 2010082479 | A1 | 7/2010 |
| WO | 2020030993 | A1 | 2/2020 |
| WO | 2021183299 | A1 | 9/2021 |
| WO | 2022066451 | A1 | 3/2022 |

OTHER PUBLICATIONS

Final Office Action for U.S. Appl. No. 16/542,923, mailed Jul. 22, 2021, 19 pages.

Advisory Action for U.S. Appl. No. 16/542,923, mailed Sep. 23, 2021, 3 pages.

Non-Final Office Action for U.S. Appl. No. 16/542,923, mailed Nov. 12, 2021, 21 pages.

Final Office Action for U.S. Appl. No. 16/542,923, mailed Mar. 2, 2022, 21 pages.

Advisory Action and Examiner-Initiated Interview Summary for U.S. Appl. No. 16/542,923, mailed May 6, 2022, 4 pages.

Non-Final Office Action for U.S. Appl. No. 16/542,923, mailed Jun. 22, 2022, 23 pages.

Final Office Action for U.S. Appl. No. 16/542,923, mailed Oct. 7, 2022, 23 pages.

Final Office Action for U.S. Appl. No. 16/542,923, mailed Nov. 14, 2022, 29 pages.

Advisory Action and Examiner-Initiated Interview Summary for U.S. Appl. No. 16/542,923, mailed Dec. 15, 2022, 4 pages.

Non-Final Office Action for U.S. Appl. No. 16/543,009, mailed Apr. 1, 2021, 14 pages.

Final Office Action for U.S. Appl. No. 16/543,009, mailed Jul. 23, 2021, 15 pages.

Advisory Action for U.S. Appl. No. 16/543,009, mailed Sep. 23, 2021, 3 pages.

Final Office Action for U.S. Appl. No. 16/543,009, mailed Nov. 12, 2021, 15 pages.

Non-Final Office Action for U.S. Appl. No. 16/543,009, mailed Mar. 4, 2022, 15 pages.

Final Office Action for U.S. Appl. No. 16/543,009, mailed Jun. 10, 2022, 16 pages.

Non-Final Office Action for U.S. Appl. No. 16/543,009, mailed Oct. 7, 2022, 16 pages.

Final Office Action for U.S. Appl. No. 16/543,009, mailed Jan. 19, 2023, 19 pages.

Non-Final Office Action for U.S. Appl. No. 16/815,101, mailed Nov. 12, 2021, 13 pages.

Final Office Action for U.S. Appl. No. 16/815,101, mailed Mar. 2, 2022, 14 pages.

Advisory Action and Examiner-Initiated Interview Summary for U.S. Appl. No. 16/815,101, mailed May 6, 2022, 4 pages.

Non-Final Office Action for U.S. Appl. No. 16/815,101, mailed Jun. 22, 2022, 17 pages.

Final Office Action for U.S. Appl. No. 16/815,101, mailed Oct. 7, 2022, 16 pages.

Advisory Action and Examiner-Initiated Interview Summary for U.S. Appl. No. 16/815,101, mailed Dec. 20, 2022, 4 pages.

Ex Parte Quayle Action for U.S. Appl. No. 16/815,101, mailed Jan. 19, 2023, 7 pages.

Non-Final Office Action for U.S. Appl. No. 17/081,522, mailed Jan. 20, 2022, 18 pages.

Final Office Action for U.S. Appl. No. 17/081,522, mailed Apr. 28, 2022, 10 pages.

Advisory Action for U.S. Appl. No. 17/081,522, mailed Jul. 5, 2022, 3 pages.

Non-Final Office Action for U.S. Appl. No. 17/081,522, mailed Aug. 17, 2022, 9 pages.

Final Office Action for U.S. Appl. No. 17/081,522, mailed Nov. 10, 2022, 10 pages.

Advisory Action and Examiner-Initiated Interview Summary for U.S. Appl. No. 17/081,522, mailed Jan. 23, 2023, 4 pages.

(56) References Cited

OTHER PUBLICATIONS

Non-Final Office Action for U.S. Appl. No. 16/906,129, mailed Jun. 9, 2022, 14 pages.
Final Office Action for U.S. Appl. No. 16/906,129, mailed Dec. 12, 2022, 15 pages.
Notice of Allowance and Examiner-Initiated Interview Summary for U.S. Appl. No. 16/542,923, mailed Mar. 17, 2023, 11 pages.
Notice of Allowance for U.S. Appl. No. 16/815,101, mailed Feb. 13, 2023, 10 pages.
Non-Final Office Action for U.S. Appl. No. 17/081,522, mailed Mar. 2, 2023, 11 pages.
Notice of Allowance for U.S. Appl. No. 16/906,129, mailed Feb. 27, 2023, 10 pages.
Notification to Grant for Chinese Patent Application No. 202080025541.3, mailed Mar. 20, 2024, 6 pages.
Notice of Preliminary Rejection for Korean Patent Application No. 10-2022-7034893, mailed Mar. 7, 2024, 17 pages.
Invitation to Pay Additional Fees and Partial Search for International Patent Application No. PCT/US2024/013657, mailed Apr. 15, 2024, 11 pages.
Written Decision on Registration for Korean Patent Application No. 10-2021-7035365, mailed Mar. 18, 2024, 7 pages.
Advisory Action and Examiner-Initiated Interview Summary for U.S. Appl. No. 18/320,498, mailed May 3, 2024, 4 pages.
Author Unknown, "ARRI LogC4: Logarithmic Color Space," Specification, first published Jul. 7, 2021, ARRI AG, 20 pages.
Examination Report for European Patent Application No. 21713274.5, mailed May 28, 2024, 7 pages.
Notice of Reason for Rejection for Japanese Patent Application No. 2023-113594, mailed May 28, 2024, 10 pages.
Notification to Grant for Korean Patent Application No. 10-2022-7034893, mailed Jun. 18, 2024, 5 pages.
International Search Report and Written Opinion for International Patent Application No. PCT/US2024/013657, mailed Jun. 12, 2024, 17 pages.
Invitation to Pay Additional Fees and Partial Search for International Patent Application No. PCT/US2024/021668, mailed Jul. 5, 2024, 13 pages.
Advisory Action and Examiner-Initiated Interview Summary for U.S. Appl. No. 16/437,878, mailed Jun. 4, 2024, 4 pages.
Non-Final Office Action for U.S. Appl. No. 18/320,498, mailed May 28, 2024, 18 pages.
Notice of Preliminary Rejection for Korean Patent Application No. 10-2024-7018777, mailed Jun. 25, 2024, 19 pages.
Author Unknown, "APA102-2020 Super LED," Datasheet, Shenzhen LED Color Opto Electronic Co., Ltd., retrieved Apr. 10, 2019 from http://www.led-color.com/upload/201604/APA102-2020%20SMD%20LED.pdf, 6 pages.
Author Unknown, "APA102C: RGB Full Color LED control IC," iPixel LED, Shiji Lighting, retrieved Apr. 10, 2019 from https://cdn-shop.adafruit.com/datasheets/APA102.pdf, 5 pages.
Author Unknown, "Self-clocking signal," Jul. 1, 2018, Wikipedia, https://en.wikipedia.org/w/index.php?title=Self-clocking_signal&oldid=848405107, 3 pages.
Author Unknown, "Serial communication," May 2, 2019, Wikipedia, https://en.wikipedia.org/w/index.php?title=Serial_communication&oldid=895110130, 4 pages.
Author Unknown, "SK6812 Technical Data Sheet," Shenzhen LED Color Optoelectronic Co., Ltd., retrieved Apr. 10, 2019 from https://cdn-shop.adafruit.com/product-files/1138/SK6812+LED+datasheet+.pdf, 8 pages.
Author Unknown, "SK6812RGBW Specification: Integrated Light Source Intelligent Control of Chip-On-Top SMD Type LED," Jul. 31, 2015, Dongguang Opsco Optpelectronics Co., Ltd., 16 pages.
Author Unknown, "WS2811: Signal line 256 Gray level 3 channal Constant current LED drive IC," Worldsemi, retrieved May 23, 2019 from https://cdn-shop.adafruit.com/datasheets/WS2811.pdf, 7 pages.
Author Unknown, "WS2812: Intelligent control LED integrated light source," Worldsemi, retrieved Apr. 10, 2019 from https://cdn-shop.adafruit.com/datasheets/WS2811.pdf, 5 pages.
Zhu, K., "EC20-6812 Specification: Embedded Control LED," Dec. 19, 2018, Shenzhen Normand Electronic Co., Ltd., 35 pages.
Invitation to Pay Additional Fees and Partial Search for International Patent Application No. PCT/US2020/023140, mailed Jun. 16, 2020, 25 pages.
International Search Report and Written Opinion for International Patent Application No. PCT/US2020/023140, mailed Aug. 11, 2020, 27 pages.
Non-Final Office Action for U.S. Appl. No. 16/369,003, mailed Aug. 21, 2020, 15 pages.
Non-Final Office Action for U.S. Appl. No. 16/381,116, mailed Aug. 21, 2020, 8 pages.
Non-Final Office Action for U.S. Appl. No. 16/437,878, mailed Aug. 21, 2020, 14 pages.
Non-Final Office Action for U.S. Appl. No. 16/542,923, mailed Aug. 21, 2020, 15 pages.
Reason for Rejection for Japanese Patent Application No. 2021-560354, mailed Oct. 11, 2022, 7 pages.
Invitation to Pay Additional Fees and Partial Search for International Patent Application No. PCT/US2021/019708, mailed May 25, 2021, 17 pages.
International Search Report and Written Opinion for International Patent Application No. PCT/US2021/019708, mailed Jul. 19, 2021, 23 pages.
Final Office Action for U.S. Appl. No. 16/369,003, mailed Dec. 9, 2020, 17 pages.
Advisory Action for U.S. Appl. No. 16/369,003, mailed Feb. 11, 2021, 3 pages.
Non-Final Office Action for U.S. Appl. No. 16/369,003, mailed Apr. 1, 2021, 18 pages.
Final Office Action for U.S. Appl. No. 16/369,003, mailed Jul. 22, 2021, 16 pages.
Advisory Action for U.S. Appl. No. 16/369,003, mailed Sep. 23, 2021, 3 pages.
Non-Final Office Action for U.S. Appl. No. 16/369,003, mailed Nov. 12, 2021, 19 pages.
Final Office Action for U.S. Appl. No. 16/369,003, mailed Mar. 31, 2022, 23 pages.
Non-Final Office Action for U.S. Appl. No. 16/369,003, mailed Jul. 21, 2022, 29 pages.
Final Office Action for U.S. Appl. No. 16/369,003, mailed Nov. 1, 2022, 23 pages.
Final Office Action for U.S. Appl. No. 16/369,003, mailed Nov. 3, 2022, 24 pages.
Final Office Action for U.S. Appl. No. 16/369,003, mailed Dec. 12, 2022, 24 pages.
Final Office Action for U.S. Appl. No. 16/381,116, mailed Dec. 10, 2020, 10 pages.
Advisory Action for U.S. Appl. No. 16/381,116, mailed Feb. 11, 2021, 3 pages.
Non-Final Office Action for U.S. Appl. No. 16/381,116, mailed Apr. 1, 2021, 12 pages.
Final Office Action for U.S. Appl. No. 16/381,116, mailed Jul. 22, 2021, 9 pages.
Non-Final Office Action for U.S. Appl. No. 16/381,116, mailed Nov. 12, 2021, 10 pages.
Final Office Action for U.S. Appl. No. 16/381,116, mailed Mar. 2, 2022, 17 pages.
Advisory Action and Examiner-Initiated Interview Summary for U.S. Appl. No. 16/381,116, mailed May 6, 2022, 4 pages.
Non-Final Office Action for U.S. Appl. No. 16/381,116, mailed Jun. 22, 2022, 17 pages.
Final Office Action for U.S. Appl. No. 16/381,116, mailed Oct. 4, 2022, 17 pages.
Final Office Action for U.S. Appl. No. 16/437,878, mailed Dec. 9, 2020, 14 pages.
Advisory Action and Examiner-Initiated Interview Summary for U.S. Appl. No. 16/437,878, mailed Feb. 11, 2021, 4 pages.
Non-Final Office Action for U.S. Appl. No. 16/437,878, mailed Apr. 1, 2021, 16 pages.

(56) References Cited

OTHER PUBLICATIONS

Non-Final Office Action for U.S. Appl. No. 16/437,878, mailed Apr. 23, 2021, 17 pages.
Final Office Action for U.S. Appl. No. 16/437,878, mailed Sep. 1, 2021, 16 pages.
Non-Final Office Action for U.S. Appl. No. 16/437,878, mailed Dec. 15, 2021, 17 pages.
Final Office Action for U.S. Appl. No. 16/437,878, mailed Mar. 31, 2022, 22 pages.
Final Office Action for U.S. Appl. No. 16/437,878, mailed Jul. 21, 2022, 23 pages.
Non-Final Office Action for U.S. Appl. No. 16/437,878, mailed Oct. 27, 2022, 21 pages.
Final Office Action for U.S. Appl. No. 16/542,923, mailed Dec. 10, 2020, 16 pages.
Advisory Action and Examiner-Initiated Interview Summary for U.S. Appl. No. 16/542,923, mailed Feb. 11, 2021, 4 pages.
Non-Final Office Action for U.S. Appl. No. 16/542,923, mailed Apr. 1, 2021, 19 pages.
Notice of Reason for Rejection for Japanese Patent Application No. 2022-554701, mailed Sep. 19, 2023, 11 pages.
Advisory Action for U.S. Appl. No. 16/437,878, mailed Nov. 28, 2023, 3 pages.
Non-Final Office Action for U.S. Appl. No. 18/320,498, mailed Dec. 6, 2023, 12 pages.
Decision to Grant for Japanese Patent Application No. 2023-113594, mailed Nov. 7, 2024, 5 pages.
Decision on Appeal for U.S. Appl. No. 16/381,116, mailed Sep. 23, 2024, 14 pages.
Advisory Action for U.S. Appl. No. 18/320,498, mailed Nov. 6, 2024, 4 pages.
Non-Final Office Action for U.S. Appl. No. 18/655,639, mailed Nov. 22, 2024, 10 pages.
Final Office Action for U.S. Appl. No. 16/437,878, mailed Sep. 19, 2023, 20 pages.
Non-Final Office Action for U.S. Appl. No. 17/081,522, mailed Sep. 13, 2023, 13 pages.
Non-Final Office Action for U.S. Appl. No. 18/065,397, mailed Aug. 28, 2023, 9 pages.
Non-Final Office Action for U.S. Appl. No. 18/298,049, mailed Oct. 5, 2023, 9 pages.
Notice of Reason for Rejection for Japanese Patent Application No. 2021-560354, mailed Mar. 10, 2023, 4 pages.
International Search Report and Written Opinion for International Patent Application No. PCT/US2023/061653, mailed Apr. 6, 2023, 24 pages.
Notice of Allowance for U.S. Appl. No. 16/369,003, mailed Mar. 30, 2023, 9 pages.
Advisory Action and Examiner-Initiated Interview Summary for U.S. Appl. No. 16/437,878, mailed Apr. 14. 2023, 4 pages.
Advisory Action and Examiner-Initiated Interview Summary for U.S. Appl. No. 16/543,009, mailed Mar. 28, 2023, 4 pages.
International Search Report and Written Opinion for International Patent Application No. PCT/US2024/021668, mailed Aug. 26, 2024, 20 pages.
Notice of Allowance for U.S. Appl. No. 16/437,878, mailed Jul. 29, 2024, 11 pages.
Final Office Action for U.S. Appl. No. 18/320,498, mailed Sep. 6, 2024, 21 pages.
Non-Final Office Action for U.S. Appl. No. 16/437,878, mailed May 31, 2023, 19 pages.
Notice of Allowance for U.S. Appl. No. 16/543,009, mailed May 24, 2023, 10 pages.
Final Office Action for U.S. Appl. No. 17/081,522, mailed Jun. 7, 2023, 11 pages.
Examination Report for European Patent Application No. 20718953.1, mailed Jul. 6, 2023, 11 pages.
Non-Final Office Action for U.S. Appl. No. 16/437,878, mailed Jan. 3, 2024, 20 pages.
Final Office Action for U.S. Appl. No. 17/081,522, mailed Dec. 13, 2023, 15 pages.
First Office Action for Chinese Patent Application No. 2020800255413, mailed Oct. 25, 2023, 19 pages.
Decision to Grant for Japanese Patent Application No. 2022-554701, mailed Feb. 20, 2024, 6 pages.
International Search Report and Written Opinion for International Patent Application No. PCT/US2023/079460, mailed Feb. 23, 2024, 16 pages.
Final Office Action for U.S. Appl. No. 16/437,878, mailed Apr. 5, 2024, 21 pages.
Final Office Action for U.S. Appl. No. 18/320,498, mailed Feb. 27, 2024, 14 pages.
Notice of Allowance for U.S. Appl. No. 17/081,522, mailed Apr. 5, 2024, 8 pages.
Notice of Allowance for U.S. Appl. No. 18/298,049, mailed Feb. 2, 2024, 9 pages.
Advisory Action and Examiner-Initiated Interview Summary for U.S. Appl. No. 17/081,522, mailed Feb. 16, 2024, 5 pages.
Zou, Ying-Yong, "The high-video image acquisition and displaying system based on CPLD technology," Journal of Changchun University, vol. 16, Issue 4, Aug. 28, 2006, 4 pages.
Office Action for Taiwanese Patent Application No. 114125525, mailed Mar. 3, 2026, 11 pages.
Notice of Preliminary Rejection for Korean Patent Application No. 10-2025-7030664, mailed Apr. 21, 2026, 14 pages.

* cited by examiner

56

| Description | Pixel 1 Data | | | | | | | | Pixel 2 Data | | | | | | | | Pixel 3 Data | | | | | | | |
|---|---|---|---|---|---|---|---|---|---|---|---|---|---|---|---|---|---|---|---|---|---|---|---|---|
| Bit Number | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 |
| Pixel 1 Input | x | x | x | x | x | x | x | x | x | x | x | x | x | x | x | x | x | x | x | x | x | x | x | x |
| Pixel 2 Input | x | x | x | x | x | x | x | x | x | x | x | x | x | x | x | x | x | x | x | x | x | x | x | x |
| Pixel 3 Input | x | x | x | x | x | x | x | x | x | x | x | x | x | x | x | x | x | x | x | x | x | x | x | x |
| Pixel 3 Output | x | x | x | x | x | x | x | x | x | x | x | x | x | x | x | x | x | x | x | x | x | x | x | x |

| Description | Number Data Units - 1 | | | | | | | | Sync Value | | | | | | | | Number Bytes - 1 | | | | | | | | Command | | | | | | | |
|---|---|---|---|---|---|---|---|---|---|---|---|---|---|---|---|---|---|---|---|---|---|---|---|---|---|---|---|---|---|---|---|---|
| Bit Number | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 |
| Pixel 1 Input | 0 | 0 | 0 | 0 | 0 | 0 | 1 | 0 | 0 | 0 | 0 | 0 | 1 | 1 | 0 | 0 | 0 | 0 | 0 | 0 | 0 | 0 | 1 | 0 | x | x | x | x | x | x | x | x |
| Pixel 2 Input | 0 | 0 | 0 | 0 | 0 | 0 | 0 | 1 | 0 | 0 | 0 | 0 | 1 | 0 | 1 | 1 | 0 | 0 | 0 | 0 | 0 | 0 | 1 | 0 | x | x | x | x | x | x | x | x |
| Pixel 3 Input | 0 | 0 | 0 | 0 | 0 | 0 | 0 | 0 | 0 | 0 | 0 | 0 | 1 | 0 | 1 | 0 | 0 | 0 | 0 | 0 | 0 | 0 | 1 | 0 | x | x | x | x | x | x | x | x |
| Pixel 3 Output | 1 | 1 | 1 | 1 | 1 | 1 | 1 | 1 | 0 | 0 | 0 | 0 | 1 | 0 | 0 | 1 | 0 | 0 | 0 | 0 | 0 | 0 | 1 | 0 | x | x | x | x | x | x | x | x |

FIG. 6

LIGHT-EMITTING DIODE PACKAGES WITH REAL-TIME PROCESSING AND RELATED METHODS

FIELD OF THE DISCLOSURE

The present disclosure relates to light-emitting diode (LED) packages and, more particularly, to real-time processing for LED packages and related methods.

BACKGROUND

Light-emitting diodes (LEDs) are solid-state devices that convert electrical energy to light and generally include one or more active layers of semiconductor material (or an active region) arranged between oppositely doped n-type and p-type layers. When a bias is applied across the doped layers, holes and electrons are injected into the one or more active layers where they recombine to generate emissions such as visible light or ultraviolet emissions.

LEDs have been widely adopted in various illumination contexts, for backlighting of liquid crystal display (LCD) systems (e.g., as a substitute for cold cathode fluorescent lamps) and for direct-view LED displays. Applications utilizing LED arrays include vehicular headlamps, roadway illumination, light fixtures, and various indoor, outdoor, and specialty contexts. Desirable characteristics of LED devices include high luminous efficacy and long lifetime.

Large format multi-color direct-view LED displays (including full color LED video screens) typically include numerous individual LED panels, packages, and/or components providing image resolution determined by the distance between adjacent pixels or "pixel pitch." Direct-view LED displays typically include three-color displays with arrayed red, green, and blue (RGB) LEDs, and two-color displays with arrayed red and green (RG) LEDs. Other colors and combinations of colors may be used. For many LED display systems, it is desirable to form LED color groups for each pixel such as primary colors red, green, and blue (RGB) that define vertices of a triangle (or polygon) on a chromaticity diagram. This polygon defines the so-called color gamut of the display device, the area of which describes all the possible colors that the display device is capable of producing. Driver printed circuit boards for controlling LED displays are typically densely populated with electrical devices including capacitors, field effect transistors (FETs), decoders, microcontrollers, and the like for driving the pixels of the display. As pixel pitches continue to decrease for higher resolution displays, the density of such electrical devices scales higher corresponding to the increased number of pixels for a given panel area. This tends to add higher complexity and costs to LED panels for display applications.

The art continues to seek improved LED array devices with small pixel pitches while overcoming limitations associated with conventional devices and production methods.

SUMMARY

The present disclosure relates to light-emitting diode (LED) packages and, more particularly, to real-time digital communication for LED packages and related methods. Discrete LED packages are arranged for cascade communication. Each LED package includes one or more LED chips, and each LED package is separately capable of receiving communication from a data stream, controlling operation of the one or more LED chips, and performing real-time processing on at least one alterable data value of the data stream. LED packages may include real-time processors capable of processing data from a data value of the data stream and introducing the processed or altered data back into the data stream in the same data value. LED packages are disclosed that may be assembled together in arrays where each LED package may separately process data and send the processed data to the next downstream LED package. Such real-time processing may be performed while also providing various bit delays within each LED package.

In one aspect, a method of digital communication comprises: transmitting digital communication from at least one light-emitting diode (LED) package to at least one other element, the digital communication comprising a bit pattern that includes at least one alterable data value; and performing real-time processing on the at least one alterable data value within the at least one LED package. In certain embodiments, the at least one alterable data value comprises at least 2 bits up to 64 bits. In certain embodiments, the at least one alterable data value is a data position value within a data stream, the data position value being correlated to a position of a data value within a data stream segment of the data stream, the data value being targeted for the at least one LED package. In certain embodiments: the at least one LED package is a first LED package of a plurality of LED packages serially connected to receive the digital communication from the data stream, the first LED package being arranged to receive the digital communication before other LED packages of the plurality of LED packages; the data value precedes a first data segment of a plurality of data segments of the data stream segment, wherein each data segment of the plurality of data segments is targeted for a distinct LED package of the plurality of LED packages; and the data stream segment is arranged in reverse order such that that the first data segment targeted for the first LED package is received after other data segments of the plurality of data segments that are targeted for the other LED packages have been received by the first LED package. In certain embodiments, the at least one alterable data value is a delay value correlated to a delay time when the at least one LED package performs one or more events. In certain embodiments: the at least one LED package is a first LED package of a plurality of LED packages serially connected to receive the digital communication; and the delay value is altered so that two or more other LED packages of the plurality of LED packages have events synchronized with the one or more events of the first LED package. In certain embodiments, the real-time processing comprises at least one of adding, subtracting, multiplying, dividing, incrementing, or decrementing received values of the at least one alterable data value.

In another aspect, a method of timing operation for at least one light-emitting diode (LED) package arranged for cascade serial communication comprises: receiving a one or more synchronization values at the at least one LED package; providing a delayed response correlated to the one or more synchronization values; and operating the at least one LED package in accordance to the delayed response. In certain embodiments, the one or more synchronization values are modified for use of subsequent LED packages by real-time processing within the at least one LED package. In certain embodiments, the delayed response is synchronized with another delayed response of at least one other LED package arranged to receive the cascade serial communication. In certain embodiments, onset of the delayed response is controlled by an initial timing value of a counter that is a result of a calculation, wherein a counter rate of the counter is at least partially synchronized with a data rate of the cascade serial communication. In certain embodiments, the one or more synchronization values are part of an alterable data value and the calculation is processed in real-time such that one or more values of the alterable data value are changed and transmitted in a same time slot of the alterable data value. In certain embodiments, the calculation is at least partially based on other values or states stored within the at least one LED package. In certain embodiments: the delayed response comprises at least one event; the at least one event is controlled by at least one event value; the at least one event value is an event type; and the event type comprises one or more of turning on, turning off, and setting to a predetermined value one or more LED chips that reside within the at least one LED package. In certain embodiments, the at least one event is a sequence of synchronized events comprising a first event of turning off all of the one or more LED chips for a prescribed amount of time, followed by a second event of turning on all of the one or more LED chips to a desired brightness for an associated data frame. In certain embodiments, the sequence of synchronized events further comprises a third event and a fourth event that occur between the first event and the second event, wherein the third event comprises turning on the one or more LED chips, and the fourth event comprises turning off the one or more LED chips.

In another aspect, a method of digital communication comprises: transmitting digital communication serially along a plurality of light-emitting diode (LED) packages, the digital communication comprising data values defined by a controller that is external to the plurality of LED packages, the data values being directed at the plurality of LED packages and corresponding to variable lengths of data blocks of the digital communication. In certain embodiments, the data values are conveyed to the plurality of LED packages in alterable data values of the digital communication, wherein the alterable data values are part of a bit pattern of the digital communication, the bit pattern further comprising at least parts of a preamble for each data block, the preamble comprising at least one of the data values initially defined by the controller that are successively modified by each LED package of the plurality of LED packages. In certain embodiments, at least one of the data values correspond to data positions within the data blocks of variable lengths, the data positions representing a plurality of data segments within the data blocks of variable lengths, and each data segment being targeted for a distinct LED package of the plurality of LED packages. In certain embodiments: a first LED package of the plurality of LED packages is arranged to receive the digital communication before other LED packages of the plurality of LED packages; and a last data segment of the plurality of data segments is targeted for the first LED package such that the plurality of data segments is arranged in reverse order and the last data segment is received by the first LED package after other data segments of the plurality of data segments that are targeted for the other LED packages have been received by the first LED package.

In another aspect, an LED package comprises: at least one LED chip; a digital communication receiving device configured to receive a communication signal from another LED package; and a real-time processor configured to modify an alterable data value of at least two consecutive bits of the communication signal received by the digital communication receiving device. In certain embodiments, the alterable data value is conveyed to a counter to provide a delayed response, and wherein the delayed response is correlated to at least one of a data rate of the communication signal, an internal clock of the LED package, or an external clock. In certain embodiments, the real-time processor is configured to process and modify the alterable data value such that the delayed response is synchronized with other LED chips in other LED packages arranged to receive the communication signal. The LED package may further comprise an event processor configured to activate a series of responses as the delayed response. In certain embodiments, the real-time processor comprises a data selector and a counter that are configured to correlate a position of target data to follow within the communication signal, and the target data is selected for data input to control logic within the LED package.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 6 is schematic diagram for an embodiment illustrating a bit pattern that may be received and processed by the control logic and real-time processor of FIG. 4.

DETAILED DESCRIPTION

Figure 1:
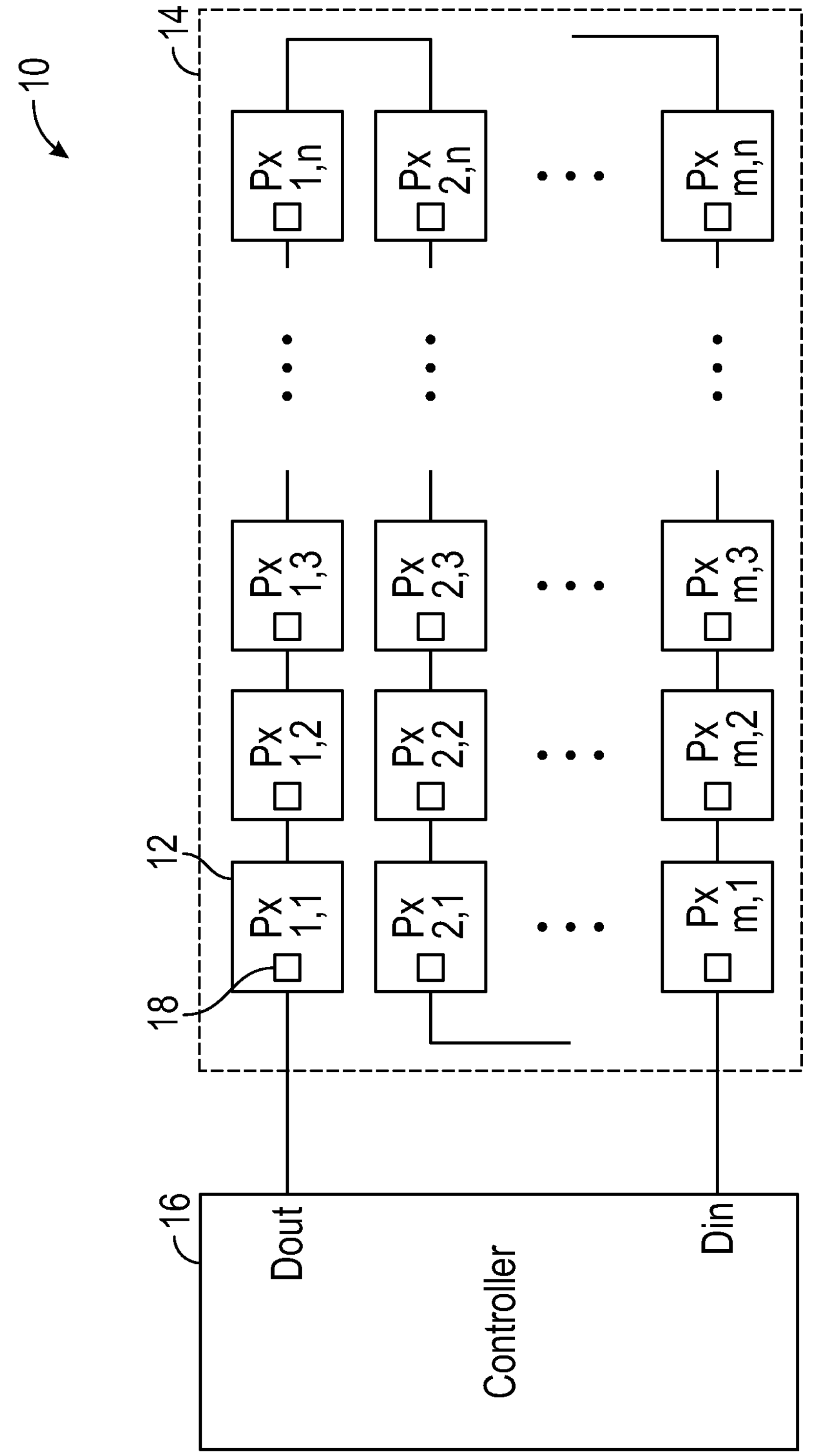
FIG. 1 is a block diagram illustrating a system level control scheme for a lighting device using cascade communication for serially connected light-emitting diode (LED) packages.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to light-emitting diode (LED) packages and, more particularly, to real-time digital communication for LED packages and related methods. Discrete LED packages are arranged for cascade communication. Each LED package includes one or more LED chips, and each LED package is separately capable of receiving communication from a data stream, controlling operation of the one or more LED chips, and performing real-time processing on at least one alterable data value of the data stream. LED packages may include real-time processors capable of processing data from a data value of the data stream and introducing the processed or altered data back into the data stream in the same data value. LED packages are disclosed that may be assembled together in arrays where each LED package may separately process data and send the processed data to the next downstream LED package. Such real-time processing may be performed while also providing various bit delays within each LED package.

In cascade digital communication, multiple electronic devices are arranged as repeaters to successively receive serial communication for operation. In the context of fine-pitch video displays, multiple LED packages are serially arranged as LED pixels to receive cascade communication. Incoming signals to each LED pixel are produced by another element, such as a master controller or the previous LED pixel, and the bitstream of incoming signals is derived from clock domains of one or more preceding devices. Proper distribution of communication signals to thousands of LED pixels creates challenges. Small sizes are required for LED packages to form pixels of high-resolution video displays and these size constraints provide further challenges.

There is a need to have all LED pixels of a video display update in a synchronized fashion. One example is that screen updates can be synchronized with video recording or photography equipment to eliminate undesired effects such as uneven exposure of a display being photographed. Another example is that three-dimensional (3D) shutter glasses need to be synchronized with the display frames targeting the left and right eyes. Common 3D display methods generally include a so-called "blanking period" where all LED pixels of a screen are turned off simultaneously for some time, such as 2 milliseconds (ms), at the beginning and/or end of each video frame. Some 3D display methods also require a short flash of light within the blanking period. The light flashes within the blanking period serve as signals to equipment such as 3D shutter glasses for discernment between left and right frames. Other 3D display methods use other communication media such as radio between the controller and headsets but still require synchronization among the pixels and blanking as the shutter glasses switch from one side to between left and right. For the purposes of this discussion, synchronization is meant to include coordinating actions of LED packages or LED pixels at the same time or within 1 ms of one another. Synchronization may further include coordinated actions of individual LED pixels such that individual or groups of LED pixels respond to their respective data with a varying delay. The above statement includes numerous more possibilities beyond all the LEDs pixels behaving in the same manner at once. For example, instead of flashing the screen, the flash could be a vertical line on the screen that flashes quickly from left to right, or any other timed pattern involving a sequence of actions.

As used herein, the terms "data stream" and "communication channel" may at times be used interchangeably. However, a "data stream" generally refers to a non-physical representation of data over time that flows through a set of at least one communication channel as well as the internal wiring and storage registers within various elements such as controllers and active electrical elements. A data stream may also be referred to as digital communication between two elements, such as a controller element that transmits digital communication and a receiver element that receives the digital communication. A "communication channel" generally refers to a physical medium through which the data stream is conveyed. For example, a communication channel may comprise a wire with associated electrical elements, an optical fiber, or even air as in the case of radio, light, or sound waves. A given physical channel could also be divided up in time or frequencies to allow multiple "communication channels" within one medium at once such as changing to a different frequency band. In certain aspects, communication channels may embody serial digital communication channels. Certain aspects relate to a binary communication channel that is a single wire referenced to a common conductor such as ground, which commonly can only hold one value at a time which is high or low voltage (e.g., digital "0" or "1") and is controlled by the output register of the preceding device. Two-wire differential signaling methods are also contemplated, but the preferred embodiment shown here refers to the single-wire approach primarily because of the added complexity of providing more traces with fine pitch displays.

In certain aspects, the present disclosure relates to light-emitting devices including LEDs, LED packages, and related LED displays and, more particularly, to active control of LEDs within LED displays. LED displays may include rows and columns of LEDs that form an array of LED pixels. A particular LED pixel may include a cluster of LED chips of the same color or multiple colors, with an exemplary LED pixel including a red LED chip, a green LED chip, and a blue LED chip. In certain embodiments, an LED package includes a plurality of LED chips that form at least one LED pixel, and a plurality of such LED packages may be arranged to form an array of LED pixels for an LED display. Each LED package may include its own active electrical element that is configured to receive a control signal and actively maintain an operating state, such as brightness or grey level or a color select signal for the LED chips of the LED device while other LED devices are being addressed. In certain embodiments, the active electrical element may include active circuitry that includes one or more of a driver device, a signal conditioning or transformation device, a memory device, a decoder device, an electrostatic discharge (ESD) protection device, a thermal management device, and a detection device, among others. The active electrical element further includes circuitry to facilitate communication with multiple uncorrelated clock domains, including an original clock domain from a controller and a local clock domain derived within the active electrical element. In this regard, each LED pixel of an LED display may be configured for operation with active matrix addressing with mixed clock domain communication. The active electrical element may be configured to receive one or more of an analog control signal, an encoded analog control signal, a digital control signal, and an encoded digital control signal. In such arrangements, strings of LED packages, each with their own active electrical element, may be arranged for serial communication where each active electrical element receives data from a data stream and transmits data to the next active electrical element in the string of LED packages.

For active matrix addressing, each LED pixel is configured to actively maintain an operating state or otherwise control the driving state, such as brightness or grey level or color select, while other LED pixels are being addressed, thereby allowing each LED pixel to maintain or otherwise independently control their driving state and provide improved viewing and/or image recording by reducing or eliminating effects caused by lower-frequency pulsing beating with aforementioned equipment (e.g., lighting sources, other pulsed displays, or image capture equipment). Accordingly, each LED pixel may be configured to hold its respective operating state with a continuous drive signal, inclusive of pulse-width modulation (PWM), rather than by conventional methods using time division multiplexed signals scanning among groups of pixels that often result in the addition of low frequency components to the drive signals associated with passive matrix addressing. In this regard, each LED pixel may include an active electrical chip or an active electrical element that may include a memory device and the ability to alter a driving condition of the LED pixel based on a state stored in the memory of the active electrical element. In certain embodiments, the continuous drive signal is a constant analog drive current, and in other embodiments where the brightness level may be controlled by pulsed methods such as PWM, the continuous drive signal may refer to a PWM signal that is not interrupted by the time division multiplexed scanning of other LED pixels within the array or within a sub-array. In certain embodiments, the active electrical element may include active circuitry that includes one or more of a driver device, a signal conditioning or transformation device, a memory device, a decoder device, an ESD protection device, a thermal management device, a detection device, and a voltage and/or current sensing device, a command processing device, and circuitry, among others. In various embodiments, an active electrical element comprises an integrated circuit chip, an application-specific integrated circuit (ASIC), a microcontroller, or a field-programmable gate array (FPGA). In certain embodiments, active electrical elements may be configured to be programmable or reprogrammable after they are manufactured through various memory elements and logic that are incorporated within the active electrical elements.

As used herein, the terms "active electrical chip," "active electrical element," or "active electrical component" include any chip or component that is able to alter a driving condition of an LED based on memory or other information that may be stored within a chip or component. As used herein, the terms "active LED pixel" and "smart LED pixel" may be used interchangeably and may refer to a device that includes one or more LED devices or chips that form a pixel and an active electrical element or chip as described above.

In certain embodiments, each LED pixel may comprise a single LED package that is configured as an active LED package that includes multiple LED chips and an active electrical element as described above. In this manner, the number of separate electrical devices needed for the LED display may be reduced, such as the separate electrical devices located on the backsides of LED panels of the LED display as previously described. Additionally, overall operating powers needed for operation of the LED panels may be reduced.

As used herein, the term "real-time" in the context of real-time processing generally refers to processing within a time constraint that permits uninterrupted processing of a data stream flowing through an LED package. For cascade serial communication of LED packages, a data stream flows continuously through a set of serially connected LED packages. As used herein, real-time processing may be defined such that data of a given block, or time slot, of a data stream is processed by an LED package, and new data may be introduced into that same block by replacing or modifying the original data as the data stream flows through an LED package. By altering a same data value of the data stream, real-time processing within an LED package occurs within a given time constraint and without interruption of the data stream. Such real-time processing may be performed within a time constraint that is generally less than 10 microseconds (μs). This provides real-time processing within a same time constraint for unprocessed data flowing through the LED package. In certain aspects as disclosed herein, LED packages may be configured to perform real-time processing with certain bit delays, such as 2-bit delays or 4-bit delays, where certain data values are processed within a same time delay as unprocessed blocks flowing through the LED package.

FIG. 1 is a block diagram 10 illustrating a system level control scheme for a lighting device using cascade communication for serially connected LED packages 12. The lighting device may embody an LED display and each LED package 12 may form an LED pixel of the display. For such applications, the terms LED package and LED pixel may be used interchangeably, although it is recognized that an LED package may be composed of several LED pixels formed together in one component. An exemplary LED string 14 arranged for serial communication is indicated by a dashed box in FIG. 1. While only the single LED string 14 is provided in detail, one or more other LED strings may also be coupled with a controller 16. As illustrated, the controller 16 is arranged to control one or more LED strings 14. The controller 16 may comprise an integrated circuit, such as one or more of an ASIC, a microcontroller, a programmable control element, and an FPGA. In certain embodiments, the controller 16 may be referred to as a master controller for the LED string 14. In other embodiments, the controller 16 may be a sub-controller to which another master controller (not shown) delegates a set of tasks as it pertains to a larger system. A data signal out (DOUT) of the controller 16 may be passed along the LED string 14 in a serial manner and a return data signal in (DIN) may be received back by the controller 16. The signal includes an original clock domain provided by the controller 16 or another master controller as described above. In FIG. 1, each LED package 12, or LED pixel, is provided with a label such as "Px 1, 1" where the first number represents a row, and the second number represents a column. Each LED package 12 includes its own active electrical element 18 that is registered and housed therewithin so that each LED package 12 comprises logic for responding to received data signals.

For cascade serial communication of the LED packages 12, important features include addressing data for a particular LED package 12, having a particular LED package 12 know its position within the LED string 14, and synchronization of the LED output in a coordinated manner with other LED packages 12 of the display. One previous technique for addressing data to a particular LED package 12 involves having each LED package 12 strip off one data set and retransmit the rest of the data along the LED string 14. However, this does not allow for return data in the data stream. Another previous technique for addressing data to a particular LED package 12 involves providing a command protocol where an executed bit is flagged by an LED package 12 for signaling downstream LED packages 12 to ignore the corresponding data. As will be further described in greater detail below, the above-described important features are provided by the present disclosure with improved efficiency while effectively synchronizing the outputs of serially connected LED packages 12. Increased intercommunication is provided between LED packages 12 arranged as LED pixels, including the communication of position and delay factors for directing specific data for each LED pixel and synchronization.

Figure 2:
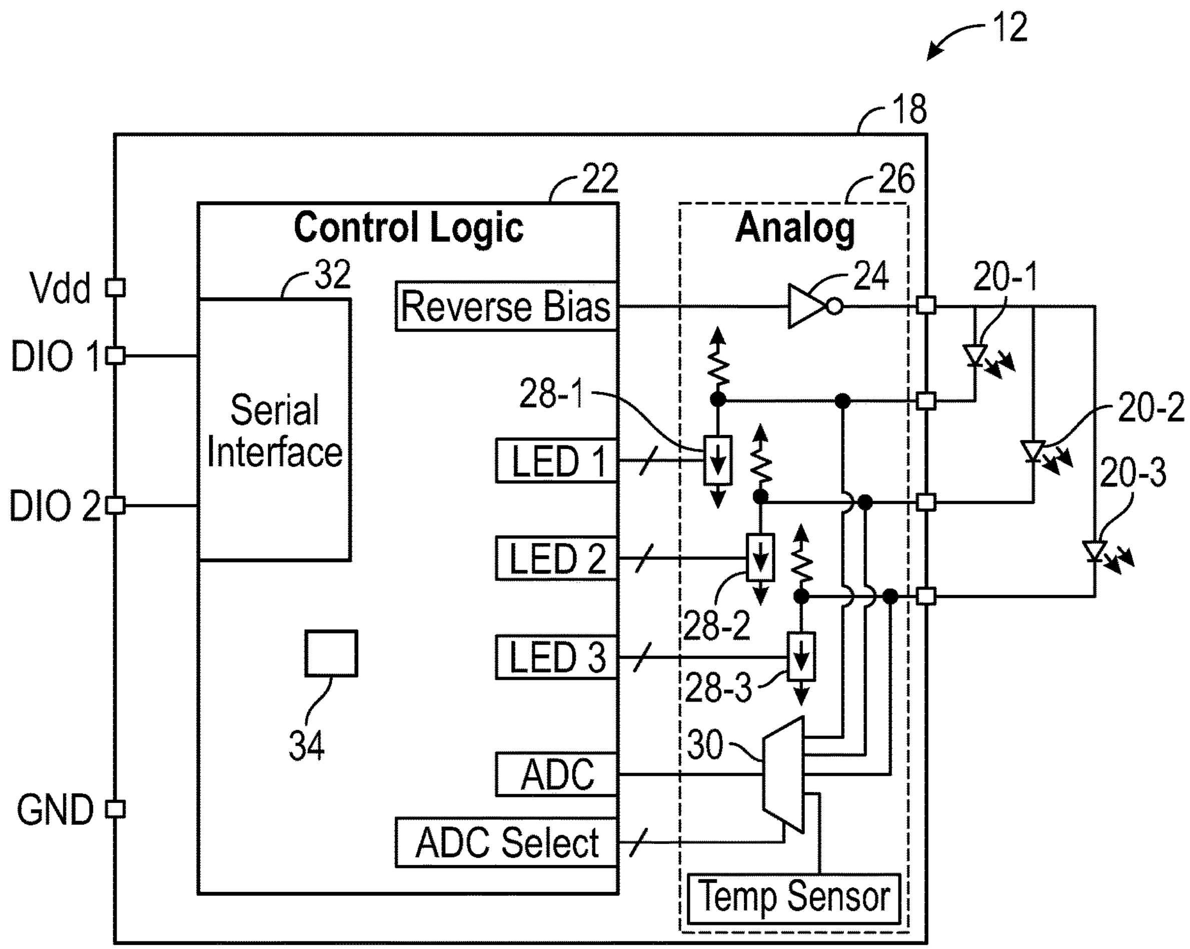
FIG. 2 is a block diagram of an LED package from FIG. 1 with certain details of an active electrical element according to principles of the present disclosure.

FIG. 2 is a block diagram of an LED package 12 from FIG. 1 with certain details of the active electrical element 18 according to principles of the present disclosure. The active electrical element 18 may include multiple ports represented by a supply voltage (Vdd), ground (GND or Vss), and bidirectional communication ports or digital input/output ports (DIO1 and DIO2) according to embodiments disclosed herein. By having the DIO1 and DIO2 ports as bidirectional communication ports, the active electrical element 18 may advantageously be able to detect an input signal from a communication channel and then assign one of the DIO1 and DIO2 ports as an input port and the other of the DIO1 and DIO2 ports as the output port. This provides flexibility in layouts for displays where a plurality of LED packages 12 are connected together for cascade communication. For example, multiple LED packages 12 may be arranged in multiple rows where data cascades from package-to-package along each row and in a serpentine manner from row-to-row as illustrated in FIG. 1. In such arrangements, the bidirectional communication ports allow the LED packages 12 to be mounted in a same orientation and receive and transmit digital communication left-to-right or right-to-left depending on the row position. In addition to the four ports of Vdd, GND, DIO1, and DIO2 on the left side of the block diagram, the active electrical element 18 includes four ports on the right side that are coupled with LEDs 20-1 to 20-3 of the LED package 12. In this regard, the LEDs 20-1 to 20-3 are packaged together with the active electrical element 18 in the common LED package 12 to form an individual pixel of a larger display. As used herein, the LEDs 20-1 to 20-3 may also be referred to as LED chips.

Certain elements of the active electrical element 18 are described below; however, it is understood that the active electrical element 18 may include many other components, including memory elements, signal conditioning elements, thermal management, electrostatic discharge elements, clock elements, and oscillators, among others. In FIG. 2, control logic 22 is arranged to receive input data, execute commands according to a command protocol, provide control signals for operation of the LEDs 20-1 to 20-3, report various voltage levels and/or temperature levels included with output data, and transmit the output data via the DIO1 and DIO2 ports to the next adjacent LED package. The control logic 22 may operate in the digital domain and may include input/output buffers electrically coupled to the DIO1 and DIO2 ports that assign input and output configurations for the bidirectional DIO1 and DIO2 ports.

In certain embodiments, the active electrical element 18 may be configured to provide both forward and reverse bias states to the LEDs 20-1 to 20-3. In this regard, the control logic 22 may include a reverse bias control output signal that, with appropriate active elements, is configured to supply either near-Vdd or near-GND voltage levels to the LEDs 20-1 to 20-3. Since the nomenclature "reverse bias" implies that a high level on the control logic 22 output produces a reverse bias condition, the output signal could simply be coupled with an inverter 24 that is provided in a driver 26 of the active electrical element 18. As such, the LEDs 20-1 to 20-3 may be either forward biased or reverse biased depending on a particular operating state and/or command received by the control logic 22. The inverter 24, or inverter logic element, may have sufficient output characteristics to drive the LEDs 20-1 to 20-3. The driver 26 may be substantially an analog interface of the active electrical element 18 that is electrically coupled with the control logic 22. The driver 26 may include controllable current sources 28-1 to 28-3 which could also be configured as LED sink drivers. Pull-up resistors R1 to R3 may be incorporated to provide paths to Vdd for each of the LEDs 20-1 to 20-3 which aid with the voltage measurement when configured for reverse bias. Each of the current sources 28-1 to 28-3 may be electrically coupled with digital output signals LED1 to LED3 of the control logic 22. The output signals LED1 to LED3 may be provided along multiple wires that are coupled to each of the current sources 28-1 to 28-3 for current selection purposes. The output signals LED1 to LED3 may embody PWM outputs of the control logic 22 for controlling operation of the LEDs 20-1 to 20-3. The driver 26 may also include a multiplexer 30 electrically coupled with an analog-to-digital (ADC) converter and ADC selector of the control logic 22. Additionally, the driver 26 may include an on-chip temperature sensor that is provided through the multiplexer 30. In certain embodiments, the temperature sensor provides thermal compensation for the LEDs 20-1 to 20-3 via a thermal compensation curve and/or thermal shut down.

The active electrical element 18 further comprises a serial interface 32 that embodies a module with circuitry configured to decode and convert the incoming signal of the data stream into a bitstream in a local clock domain, which can be further processed by the control logic 22. In this manner, the serial interface 32 may also be referred to as a digital communication receiving device. The digital communication could be received from a controller (e.g., 16 of FIG. 1) and/or another LED package in a serial string. The serial interface 32 is further configured to retransmit the decoded and converted bitstream along with modified data to the communication channel to which another LED package or another external element is connected in a manner that is compatible with the overall LED display system. In certain embodiments, the control logic 22 may include circuitry in the form of real-time logic 34 that, when enabled by other logic internal to the active electrical element 18, performs operations, such as mathematical operations, on data values received from the serial interface 32. The real-time logic 34 immediately returns the processed result, in real-time as described above, to the serial interface 32 for transmission as replacement data in a same data value. As used herein, the real-time logic 34 may also be referred to as a real-time processor. The control logic 22 may further include other circuitry, such as a finite state machine, that goes through a series of states or steps to do a set of required tasks. In this manner, one or more portions of the control logic 22 may form an event processor configured to activate a series of responses, such as a delayed response based on the real-time processing.

Figure 3:
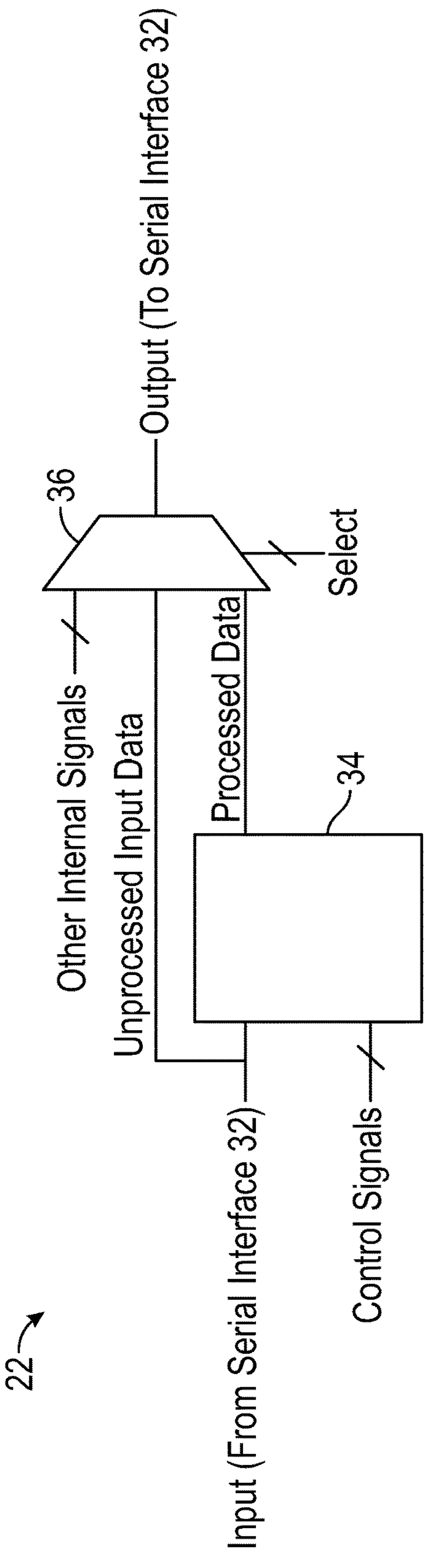
FIG. 3 is a block diagram of a portion of the control logic of FIG. 2 that includes the real-time logic.

FIG. 3 is a block diagram of a portion of the control logic 22 of FIG. 2 that includes the real-time logic 34. In FIG. 3, hash marks across various conductor lines indicate that multiple lines or signals may also be provided. The real-time logic 34 is configured to receive data from the data stream as input from the serial interface 32 of FIG. 2 for real-time processing. The processed result, or processed data, may be enabled or disabled through a multiplexer 36, different than the multiplexer 30 of FIG. 2. The multiplexer 36 is configured to select a desired signal to output back to the serial interface 32 and on to the data stream exiting the LED package 12 of FIG. 2. The desired signal for output may be selected among several possible signals received by the multiplexer 36, including the processed data from the real-time logic 34, other internal signals from the control logic 22, or unprocessed input data that bypasses the real-time logic 34 for retransmission without change. The other internal signals from the control logic 22 may include cyclic redundancy check (CRC) codes and internal status values, among others.

The real-time logic 34 may be configured to perform any number of operations on the input data for processing. Such operations include calculations with addition, subtraction, up-counting, down-counting, incrementing, decrementing, multiplication, and division, as well as more simple logic operations. As illustrated, the real-time logic 34 may also be configured to receive one or more control signals. Such control signals may include reset signals, clock signals, and various function selection signals. The various function selection signals may include signals for toggling the real-time logic 34 on and off, signals for performing the calculations, or signals for implementing other mathematical operations or processes. As further illustrated, select control signals may be provided along one or more selection lines to the multiplexer 36.

Figure 4:
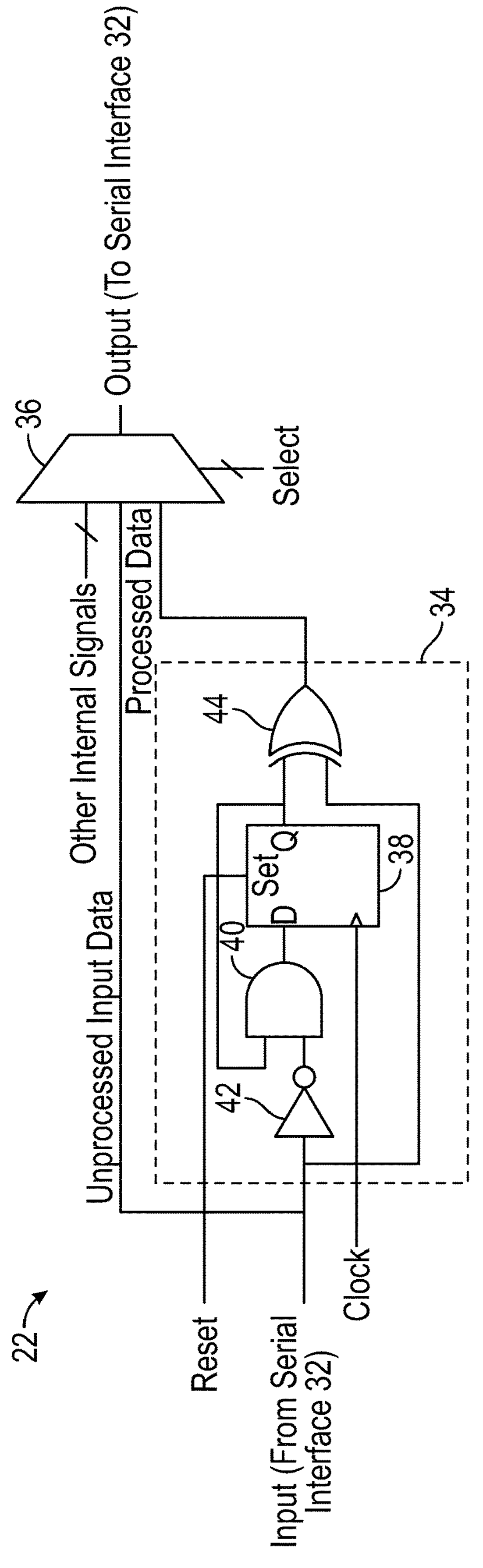
FIG. 4 is a block diagram of a portion of the control logic that is similar to FIG. 3 for embodiments where the real-time logic performs the operation of a down-counter or decrementer.

FIG. 4 is a block diagram of a portion of the control logic 22 that is similar to FIG. 3 for embodiments where the real-time logic 34 performs the operation of a counter, such as a down-counter or decrementer. In such a configuration, control signal lines of FIG. 3 are illustrated in FIG. 4 as a reset line and a clock line. By counting down to zero, an event is fired that tells the control logic 22 to copy a next data value into memory as that is the data value targeted to the particular LED package or pixel in the serial string. All other data values may be ignored and repeated to successive LED packages. In this manner, the real-time logic 34 may comprise a data selector that along with the counter are configured to correlate a position of target data to follow within the communication signal, and the target data is selected for data input to the control logic 22 within the corresponding LED package.

In FIG. 4, the real-time logic 34 includes a register element 38, such as a flip-flop circuit, a data (D) flip-flop circuit, or a latch element, that may receive the input from the serial interface 32 via AND gate 40 and inverter 42. By way of example, the following discussion of operation will be provided in the context of a D flip-flop circuit for the register element 38. For proper operation, a reset signal is applied to the register element 38 via the reset line before the operation and sets the register element 38 to a logic level 1. This flip-flop holds the borrow state of the register element 38 as it subtracts the value of 1 from the input value to perform the function of a decrementer. The input data is introduced least significant bit (LSB) first. An XOR gate 44 performs the operation between the input data value and the borrow. Once the first value of 1 is introduced to the input, the borrow is no longer needed and the borrow state becomes zero until it is reset for another decrement operation. The calculations performed, in this case down counting, may at least partially be based on a data rate of the cascade serial communication such that a counter is synchronized with the data rate. The calculations may at least partially be based on a clock, internal to the LED package or external to the LED package, such that the counter is synchronized with the clock. In certain embodiments, onset of a delayed response as described above may be controlled by an initial timing value of the counter that is a result of the calculation, and a counter rate of the counter is at least partially synchronized with the data rate of the cascade serial communication. Other values or states stored within the LED package could also be factored in the calculations. For example, received control signals may instruct the real-time logic 34 to select from incrementing or decrementing. In another example, a separately stored value could be used so that the value, such as some other value than one, is subtracted from the incoming data. The real-time logic 34 being configured as a decrementer as in FIG. 4 may be used to correlate a position of target data to follow within the communication signal, so that the target data may be selected for data input to control logic (e.g., 22 of FIG. 2) within the LED package. An example of this process is expounded below.

Figure 5A:
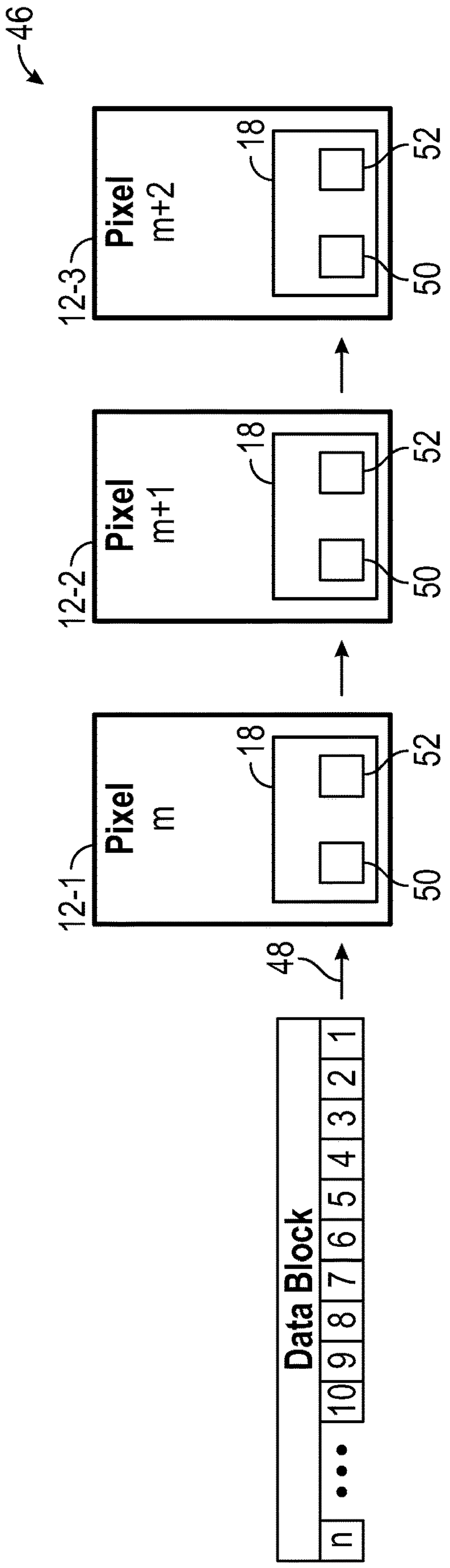
FIG. 5A is a block diagram illustrating cascade communication and processing of data bits for multiple LED packages according to principles of the present disclosure.

FIG. 5A is a block diagram 46 illustrating cascade communication and processing of data bits for multiple LED packages 12-1 to 12-3 according to principles of the present disclosure. The LED packages 12-1 to 12-3 may be arranged as part of the LED string 14 of FIG. 1. Input communication from a data stream 48 of a communication channel is received by the LED package 12-1 and transferred from an input register 50 to an output register 52 that are graphically illustrated as boxes within the LED package 12-1. The input and output registers 50, 52 represent memory locations within the active electrical element 18. The data stream may include a bit pattern of data blocks of any lengths with bits illustrated by the numbering 1, 2, 3, 4 . . . n. The data blocks may include a command code that is processed by the active electrical element 18 of each LED package 12-1 to 12-3 for controlling actions of the corresponding active electrical element 18 and/or controlling operation of corresponding LEDs within the LED packages 12-1 to 12-3.

During operation, each data bit of the data block is sequentially received and held by the input register 50 during one clock count and then transferred to the output register 52 with a next clock count. In this manner, the data stream 48 may be subject to a two-bit delay during processing. In other instances, other delays, such as a four-bit delay, could be provided by other registers within the active electrical element 18. In some instances, the bit data transferred to the output register 52 is changed or modified according to the real-time logic 34 of FIG. 2.

Figure 5B:
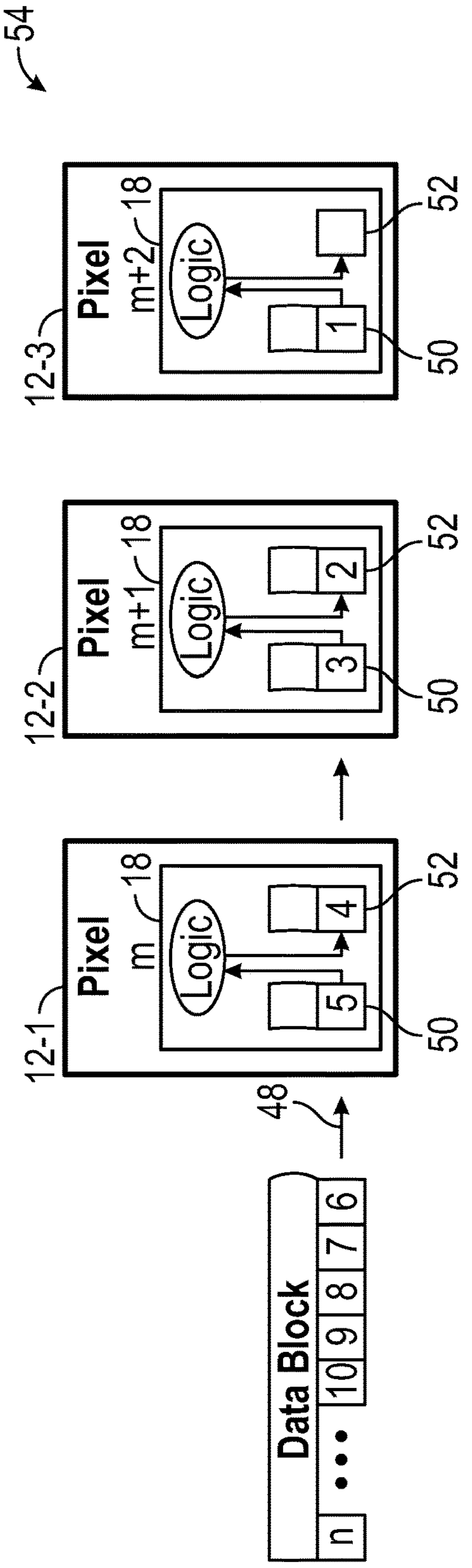
FIG. 5B is a diagram similar to the diagram of FIG. 5A and further showing progression of data bits through the LED package.

FIG. 5B is a diagram 54 similar to the diagram 46 of FIG. 5A and further showing progression of data bits through the LED package 12-1 to 12-3. As illustrated, bit positions of the data block may progress sequentially, shifting from left to right, through the input and output registers 50, 52 of the multiple LED packages 12-1 to 12-3 according to clock cycles. In this manner, a first bit position (i.e., "1") of a data block may already be held in the input register 50 of the third LED package 12-3, while bit positions "2" and "3" are in the second LED package 12-2, bit positions "4" and "5" are in the first LED package 12-1, and the remaining bit positions have yet to be received by the LED packages 12-1 to 12-3. In FIG. 5B, superimposed boxes are illustrated above the input and output registers 50, 52 to represent data blocks with respective bit positions now being distributed among the multiple LED packages 12-1 to 12-3. The internal logic of the active electrical element 18 may include the real-time logic 34 described above for FIG. 2 that is performing real-time processing during flow of the data stream 48. The next value for each output register 52 may accordingly be based on the internal state of the logic and the value of the input register 50. Such real-time processing involves processing a bit or a data value of the data block and altering the data stream at a same time slot of the processed bit or processed data value.

FIG. 6 is schematic diagram 56 for an embodiment illustrating a bit pattern that may be received and processed by the control logic 22 and real-time logic 34 of FIG. 4. For simplicity, the data element or pixel data sizes are illustrated as 8-bit bytes, but in practical systems many more bits may be required for the respective elements such as the number of bytes and the individual pixel data blocks. The Pixel 1, Pixel 2, and Pixel 3 input rows represent inputs to each of the three LED packages 12-1 to 12-3 illustrated in FIGS. 5A and 5B. The alignment of rows for the Pixel 1, Pixel 2, and Pixel 3 inputs is not intended to represent a same time for each vertical column.

During flow of the data stream, Pixel 1 takes its input and produces an output which becomes the input for Pixel 2 and so on. The Pixel 3 output row represents output data from Pixel 3 that could be the input for another downstream pixel or the portion of the data stream returning to a master controller, such as the controller 16 of FIG. 1. For simplicity, various "x" values are illustrated to represent values in the data stream that may not be related to the real-time processing principles discussed herein. The bit pattern of data or data blocks represented includes a command byte that tells the Pixels 1-3 what type of data set is to follow along with other information. Next is a preamble of 3 bytes, labeled as Number Bytes −1, Sync Value, and Number Data Units −1, that represent one or more data values of the bit pattern.

Number Bytes −1 provides information to the Pixels 1-3 regarding how many bytes follow the preamble so the Pixels 1-3 know when to expect the end of a bit pattern and perhaps another command. In FIG. 6, this value is set to "2" for zero-based counting of 3 bytes and this value isn't changed from one pixel to the next. The Sync Value is a timing value used to provide information to the Pixels 1-3 regarding when to begin an event or series of events. Pixel 1 receives the command first, but its corresponding data segment (i.e., Pixel 1 data) is received last, after the Pixel 3 data and then the Pixel 2 data segments flow through. This arrangement of the bit pattern may be referred to as a reverse order for the data segments (i.e., Pixel 3 data, Pixel 2 data, then Pixel 1 data) relative to an order of the pixels in the string (e.g., Pixel 1, Pixel 2, and then Pixel 3). Accordingly, Pixel 1 needs to delay actions longer from the receipt of the command than downstream Pixels 2 and 3 that follow. As such, Pixel 1 receives a higher Sync Value that is implemented by Pixel 1 to set a timer to fire a start events signal. In many cases, this delay could be calculated locally by Pixel 1 from the Number Bytes −1 and the Number Data Units −1, or vice versa. As such, the Sync Value could be considered redundant. However, such data redundancy may be advantageous as it requires less calculation resources within the Pixels 1-3. During processing of Pixel 1, the Sync Value is decremented by one value for the input to Pixel 2, and so on for each additional pixel. In this example, the Number Data Units −1 is another zero-based number indicating the number of pixel data units to ignore before accepting the pixel's target data sub-block. That is, the Number Data Units −1 is implemented to notify each of the Pixels 1-3 of its intended data. In FIG. 6, Pixel 3 is the last pixel in a serial string and, accordingly, the Pixel 3 output for the Number Data Units −1 is sent back to the master controller with values that are all "1." This is because during real-time processing, the Sync Value is processed and the Number Data Units −1 value is decremented as the data stream passes through each pixel. Once the value reaches zero, the next value (−1) is represented in binary as all ones as the counter rolls over.

The Sync Value portion and/or the Number Data Units −1 portion of the bit pattern may collectively form an alterable data value on which real-time processing is performed. The Sync Value portion and/or the Number Data Units −1 portion could also be referred to as two alterable data values on which real-time processing is performed. The alterable data value may include at least two bits of data in certain embodiments. In further embodiments, the alterable data value could include any number of bits, up to, for example, about 64 bits which corresponds to the standard width of a double precision floating point number. Further embodiments may include sets of such numbers which are manipulated via the real-time logic 34. The alterable data value, Number Data Units −1, refers to a data position value within a data stream, the data position value being correlated to a position of a data value within a data stream segment of the data stream that is targeted for a particular Pixel 1-3. The alterable data value may be processed and modified as it flows through each of the Pixels 1-3. Depending on the application, a length of the alterable data value may be variable during cascade communication. That is the length of the Sync Value portion and/or the Number Data Units −1 portion could vary during real-time processing based on portions of the bit pattern preamble provided by the external controller (e.g., 16 of FIG. 1).

With such real-time processing, the alterable data value, Sync Value, forms a delay value for the Pixels 1-3 to be synchronized and respond to data stream commands in a coordinated manner. In this manner, the delay value provides a correlated delay time or a delayed response to when each Pixel 1-3 performs one or more events, such as turning on, turning off, or setting to a predetermined value one or more LED chips within each Pixel 1-3. The delay value is altered as it flows through each Pixel 1-3 so that each downstream pixel can have respective events substantially synchronized.

Figure 7:
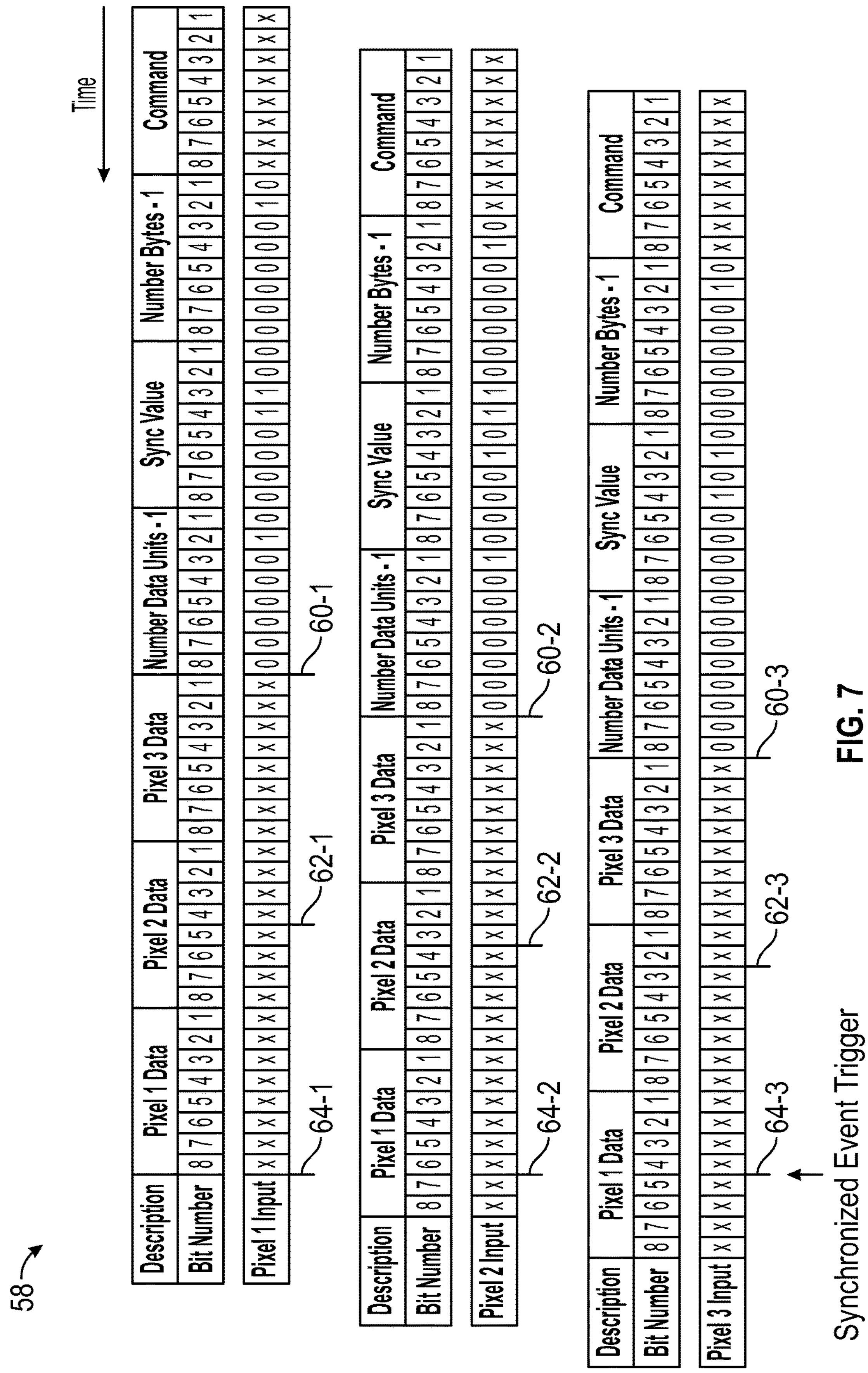
FIG. 7 is schematic diagram that is the same as FIG. 6 except the data for each pixel is delayed by two bits in time to align when each pixel receives its respective data along a common time axis.

To further illustrate how the Sync Value is used, FIG. 7 is schematic diagram 58 that is the same as FIG. 6 except the data for each Pixel 1-3 is delayed by two bits in time to align when each Pixel 1-3 receives its respective data along a common time axis. As such, the alignment of rows for the Pixel 1, Pixel 2, and Pixel 3 inputs represents a same time position for each vertical column for all Pixels 1-3. In FIG. 7, time increases in the direction to the left as the data shifts in the direction to the right. As previously discussed, the Sync Value is introduced with an initial value and is decremented by one by each Pixel 1-3. The decremented value is passed on to the next Pixel 1-3, but the input value is loaded into an internal down-counter with a single bit shift resulting in 2× the value being loaded (i.e., 12 becomes 24 being loaded in the down-counter for Pixel 1). Each Pixel 1-3 starts counting down from that number for each clock cycle in accordance to, or correlated to, the receiving of each bit. When the counter reaches zero, the Synchronized Event Trigger as illustrated in FIG. 7 is fired. Internal logic within the active electrical element of each Pixel 1-3 can use this event trigger to further delay and trigger a series of events such as blanking, flashing, and initiating the new brightness level of the corresponding LED chips. In one example, a sequence of synchronized events provides blanking where a first event turns off all the Pixels 1-3 for a prescribed amount of time, followed by a second event that turns on all of the Pixels 1-3 to a desired brightness for an associated data frame. In another example, the sequence of events may further comprise a third event and a fourth event that occur between the first event and the second event, wherein the third event comprises turning on the Pixels 1-3, and the fourth event comprises turning off the Pixels 1-3 to provide a pulse of light within the blanking period that may be used for left-right synchronization in 3D glasses. The two-bit shift represented by FIG. 7 corresponds with a two-bit delay as previously described.

Time sequences for each of the Pixels 1-3 have vertical tick marks representing the start count positions 60-1 to 60-3, 1× count 62-1 to 62-3, and 2× count 64-1 to 64-3. As illustrated, the 2× count 64-1 to 64-3 occurs at the same time for all three pixels. In particular, count positions 64-1 to 64-3 fire a synchronized event trigger. At that time, all three Pixels 1-3 have also received their targeted data segment as Pixel 1 receives its data last. Firing an event at that time may start internal processes in each Pixel 1-3 to perform in sync. This may include outputting new LED brightness values along with other actions. Various event types relate to one of several possible actions such as turning one or more LED chips on, off, or set at a predetermined value.

FIG. 7 illustrates an exemplary embodiment for demonstrating aspects of the present disclosure. Actual implementations may require wider word widths for the pixel data and the three values in the preamble. The preamble values would generally require two bytes each. For color depths between 24-48 bits, three, four, five, or six bytes are required for each Pixel 1-3. Many other embodiments are contemplated. The calculations and/or values change if there are different delays between pixels than the two-bit delay represented by FIG. 7. Instead of loading 4× the data byte length in the initial Sync Value, 8× the data byte length could be loaded and counted down by two for each pixel, and that value could be used without a shift (e.g., 2× multiplication). As discussed earlier, the Sync Value can be omitted from the preamble and calculated internally from the other two values. As shown, numerous modifications to this method are contemplated within the scope of this disclosure.

Figure 8:
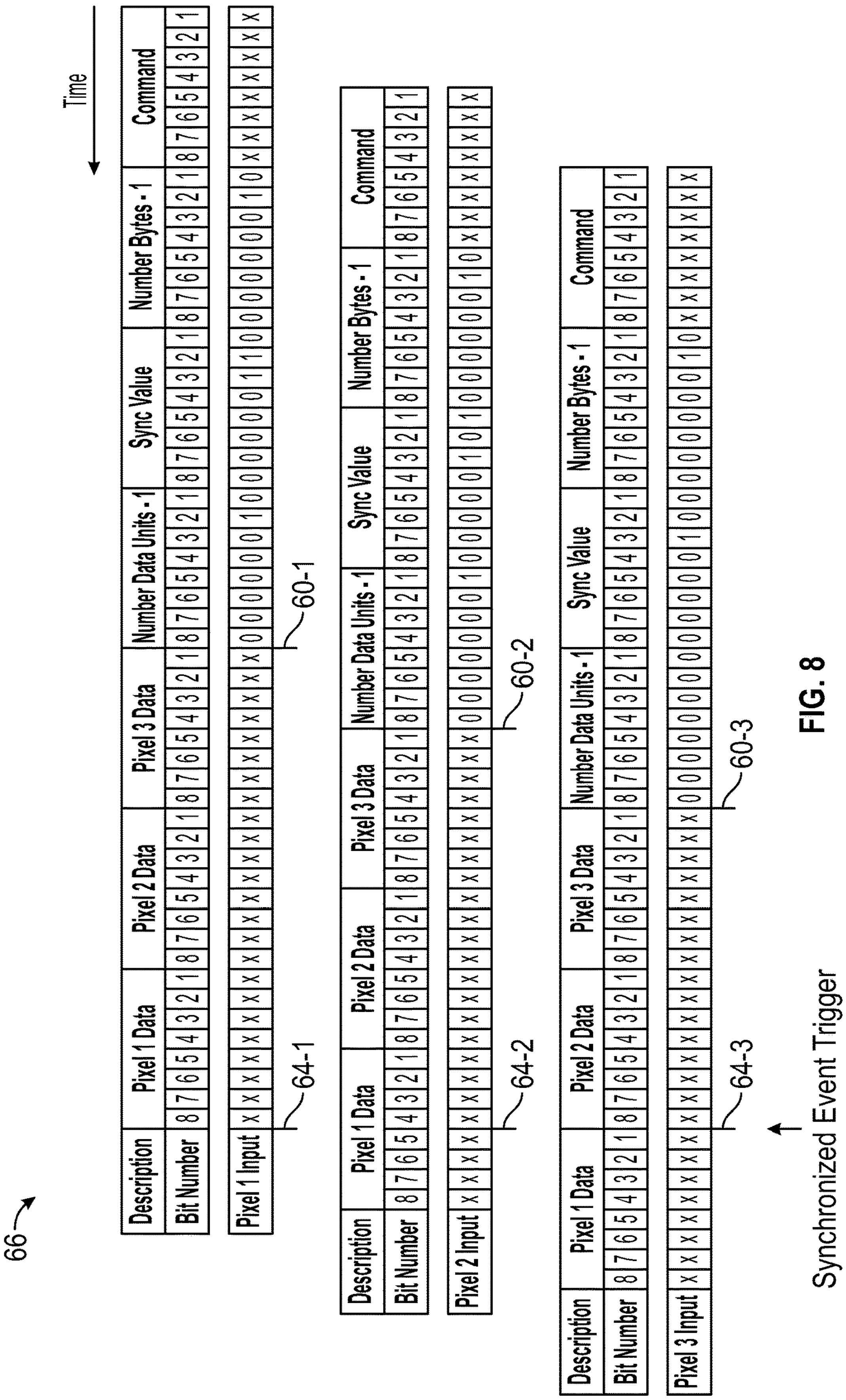
FIG. 8 is schematic diagram that is similar to FIG. 7 except the data for each pixel is delayed by four bits in time to align when each pixel receives its respective data along a common time axis.

FIG. 8 is schematic diagram 66 that is similar to FIG. 7 except the data segment for each Pixel 1-3 is delayed by four bits in time to align when each Pixel 1-3 receives its respective data along a common time axis. As with FIG. 7, the alignment of rows for the Pixel 1, Pixel 2, and Pixel 3 inputs represents a same time position for each vertical column for all Pixels 1-3. The four-bit shift represented by FIG. 8 corresponds with real-time processing with a four-bit delay as previously described. For FIG. 8, the Sync Value is changed to make the synchronization event trigger for the count positions 64-1 to 64-3 happen at the same time for all Pixels 1-3. This synchronization event trigger corresponds to when Pixel 1 receives its data segment in a similar manner as the 2-bit delay example of FIG. 7. In this example, a value of 6 (i.e., 00000110) for Pixel 1 is loaded in a counter with a 2-bit shift (4× multiplication). In this manner, Pixel 1 still counts down twenty-four clock cycles to fire the synchronization event, but Pixel 2 counts twenty cycles, and Pixel 3 counts sixteen cycles.

In certain aspects the sequences illustrated in FIGS. 6-8 represent synchronization configurations and methods that combine the use of a real-time processor (e.g., 34 of FIG. 2) at each Pixel 1-3 with the technique to count from a given position such as a command to a synchronized trigger event. In this manner, the real-time processor is configured to perform real-time processing on a same alterable data value during serial communication. In other aspects, the above-described sequence may be performed without necessarily having the real-time processor within each Pixel 1-3. Rather, values could be loaded in the Pixels 1-3 in any number of other ways such as by commands in the same way that brightness values are loaded. In still further embodiments, values could be loaded in Pixels 1-3 by way of data stream commands in combination with real-time processing by way of the real-time processer (e.g., 34 of FIG. 2) within each Pixel 1-3.

In certain aspects the sequences illustrated in FIGS. 6-8 may represent synchronization configurations and methods for data without preambles of Number Bytes −1, Sync Value, and Number Data Units −1. Instead, separate commands and/or data can provide the Pixels 1-3 parameters such as data lengths and their respective data offsets separately. In other words, the methods presented here for synchronization and respective data offsets may be employed without the use of the real-time processing by storing the values for each Pixel 1-3 to count beforehand by other means. In turn, the Pixels 1-3 may count through the data as described above with preambles of Number Bytes −1, Sync Value, and Number Data Units −1. In certain embodiments, an external data source, such as the controller 16 of FIG. 1, may define data segments of variable lengths and a number of data segments to be provided to various Pixels 1-3. In certain embodiments, data segments of variable lengths and variable numbers of data segments may be implemented in combination with real-time processing by way of the real-time processer (e.g., 34 of FIG. 2) within each Pixel 1-3.

According to the above-described embodiments, discrete LED packages may be assembled together for cascade communication in LED arrays for various applications. In one such application, the discrete LED packages form LED pixels of an LED displays. Each LED package may include one or more LED chips that form at least one individual pixel along with an active electrical element capable of receiving serial communication from a data stream, controlling operation of the one or more LED chips based on commands received in the data stream, and performing real-time processing of various data values of the data stream. Active electrical elements within each LED package may include circuitry in the form of a real-time processor that is capable of processing data from a data value or time slot of a data stream and introducing the processed data, or altered data, back into the data stream in the same data value or time slot. In this manner, each LED package in an LED display may separately process data and send the processed data to the next downstream LED package. In certain embodiments, such real-time processing may be performed while also providing various bit delays within each active electrical element, such as two-bit delays or four-bit delays. Separately performing real-time processing at each LED package, or LED pixel within a display, provides various advantages, including the ability to synchronize and/or coordinate actions of serially connected LED packages. Also according to the above-described embodiments, methods to direct certain segments of a larger data block to respective pixels are disclosed. In addition, methods to synchronize the behavior of multiple pixels are disclosed.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A method of digital communication, the method comprising:

transmitting digital communication from at least one light-emitting diode (LED) package to at least one other element, the digital communication comprising a bit pattern that includes at least one alterable data value in a time slot of the digital communication; and performing real-time processing on the at least one alterable data value within the at least one LED package such that one or more values of the at least one alterable data value are changed within the at least one LED package and transmitted in the same time slot of the at least one alterable data value.

2. The method of claim 1, wherein the at least one alterable data value comprises at least 2 bits up to 64 bits.

3. The method of claim 1, wherein the at least one alterable data value is a data position value within a data stream, the data position value being correlated to a position of a data value within a data stream segment of the data stream, the data value being targeted for the at least one LED package.

4. The method of claim 3, wherein:

the at least one LED package is a first LED package of a plurality of LED packages serially connected to receive the digital communication from the data stream, the first LED package being arranged to receive the digital communication before other LED packages of the plurality of LED packages;

the data value precedes a first data segment of a plurality of data segments of the data stream segment, wherein each data segment of the plurality of data segments is targeted for a distinct LED package of the plurality of LED packages; and the data stream segment is arranged in reverse order such that that the first data segment targeted for the first LED package is received after other data segments of the plurality of data segments that are targeted for the other LED packages have been received by the first LED package.

5. The method of claim 1, wherein the at least one alterable data value is a delay value correlated to a delay time when the at least one LED package performs one or more events.

6. The method of claim 5, wherein:

the at least one LED package is a first LED package of a plurality of LED packages serially connected to receive the digital communication; and the delay value is altered so that two or more other LED packages of the plurality of LED packages have events synchronized with the one or more events of the first LED package.

7. The method of claim 1, wherein the real-time processing comprises at least one of adding, subtracting, multiplying, dividing, incrementing, or decrementing received values of the at least one alterable data value.

8. A light-emitting diode (LED) package comprising:

at least one LED chip;

a digital communication receiving device configured to receive a communication signal from another LED package, the communication signal comprising at least one alterable data value in a time slot of the communication signal; and a real-time processor configured to modify the at least one alterable data value of at least two consecutive bits in the same time slot of the at least one alterable data value of the communication signal received by the digital communication receiving device.

9. The LED package of claim 8, wherein the alterable data value is conveyed to a counter to provide a delayed response, and wherein the delayed response is correlated to at least one of a data rate of the communication signal, an internal clock of the LED package, or an external clock.

10. The LED package of claim 9, wherein the real-time processor is configured to process and modify the alterable data value such that the delayed response is synchronized with other LED chips in other LED packages arranged to receive the communication signal.

11. The LED package of claim 9, further comprising an event processor configured to activate a series of responses as the delayed response.

12. The LED package of claim 8, wherein the real-time processor comprises a data selector and a counter that are configured to correlate a position of target data to follow within the communication signal, and the target data is selected for data input to control logic within the LED package.

* * * * *